Oct. 17, 1939.  E. H. KURTH  2,176,502
EFFICIENCY METER
Filed Feb. 27, 1934  4 Sheets-Sheet 1
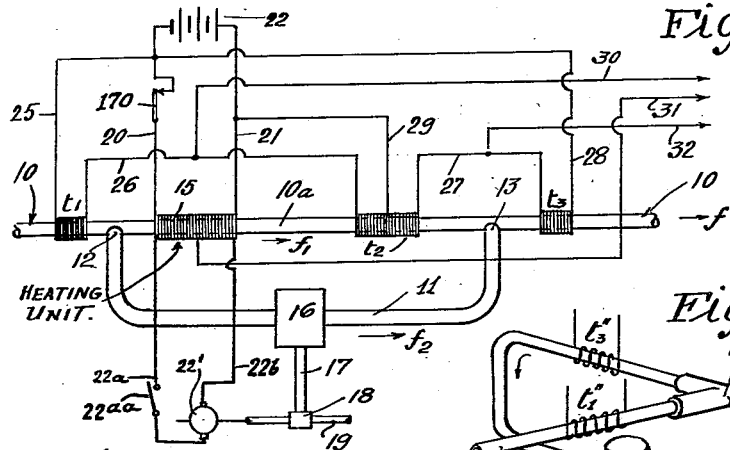
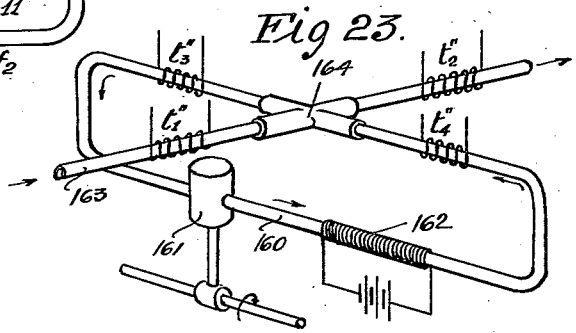
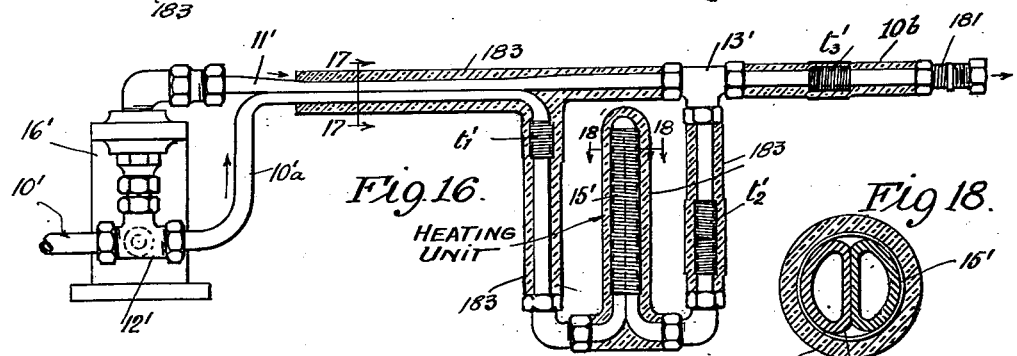
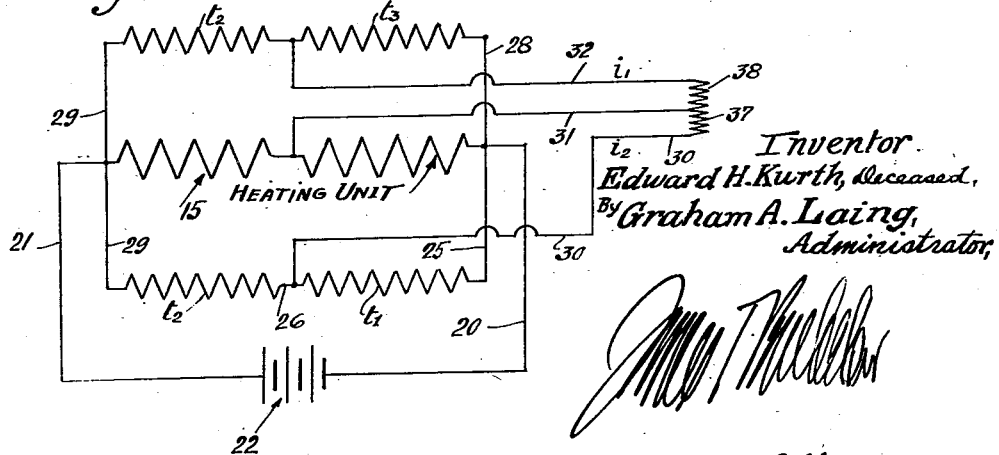
Inventor.
Edward H. Kurth, deceased,
By Graham A. Laing,
Administrator,
Attorney.

Oct. 17, 1939.  E. H. KURTH  2,176,502
EFFICIENCY METER
Filed Feb. 27, 1934  4 Sheets-Sheet 2
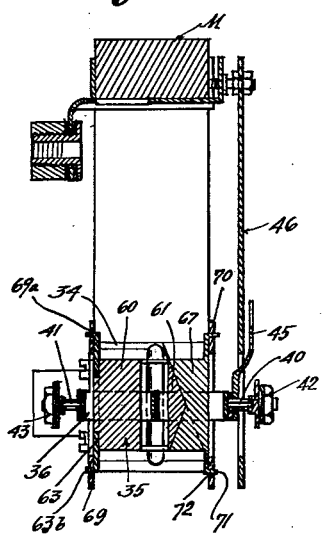
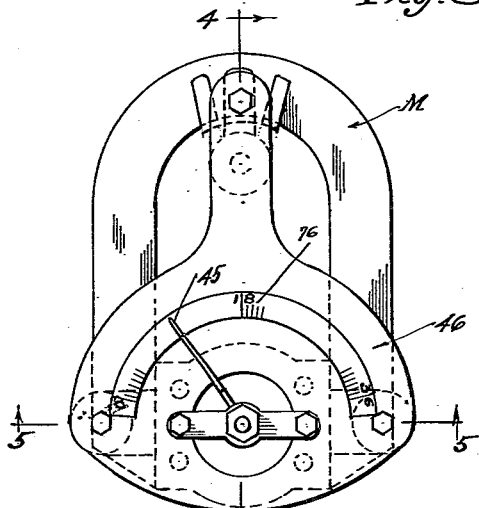
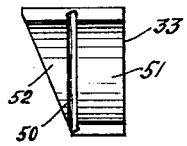
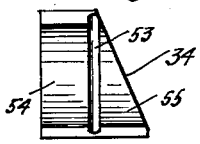
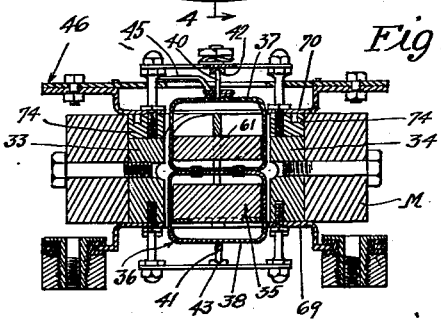
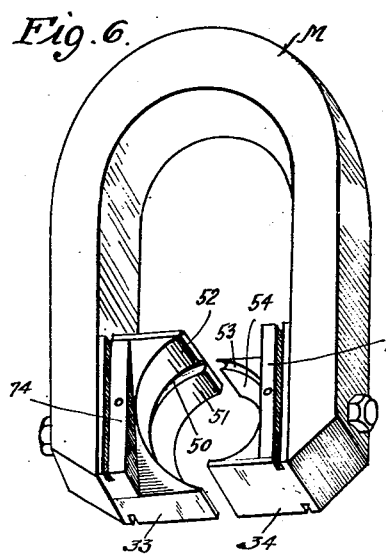
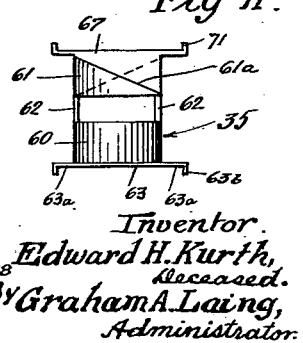
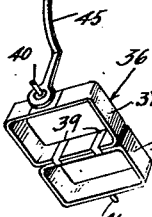
Inventor.
Edward H. Kurth,
deceased.
By Graham A. Laing,
Administrator.
Attorney

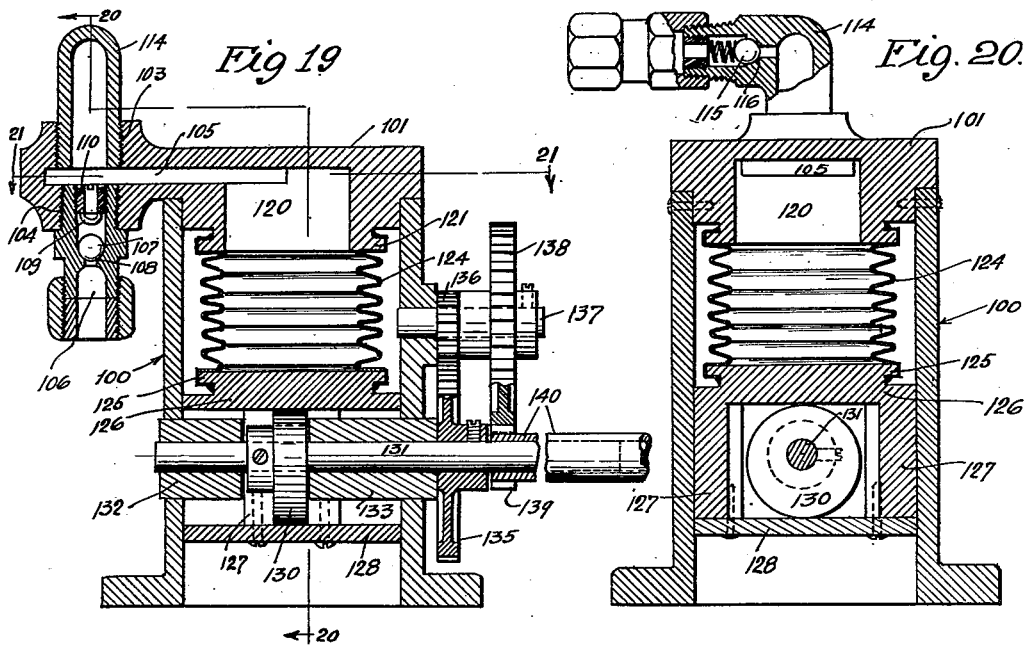
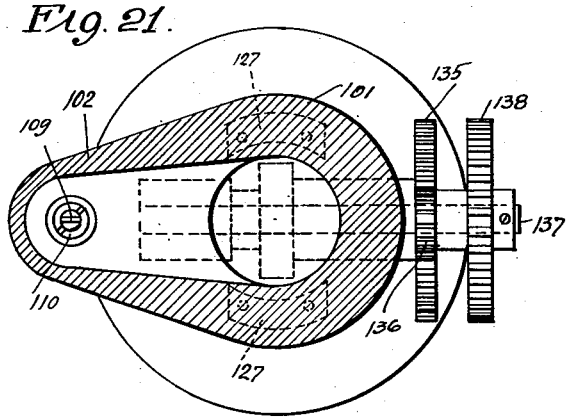
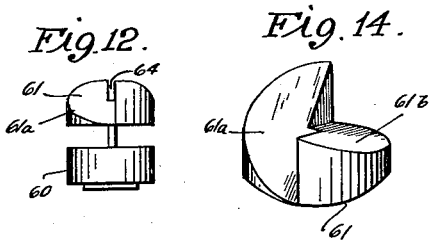
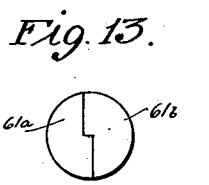
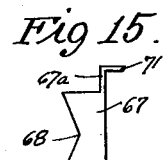
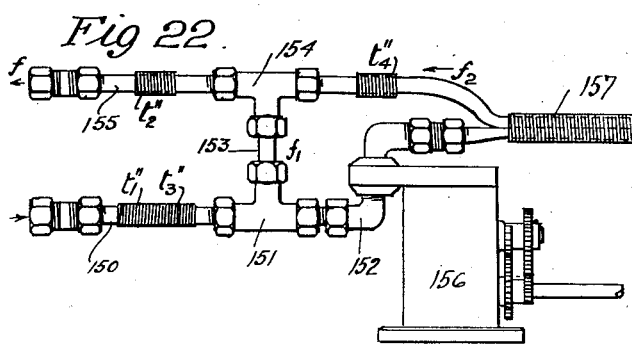

Oct. 17, 1939.  E. H. KURTH  2,176,502
EFFICIENCY METER
Filed Feb. 27, 1934   4 Sheets-Sheet 4
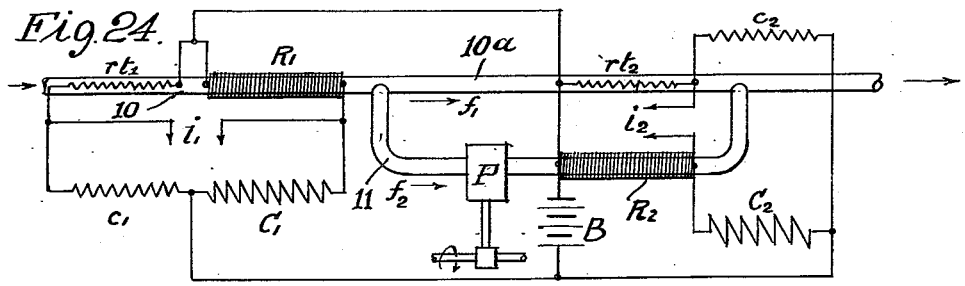
Fig. 24.
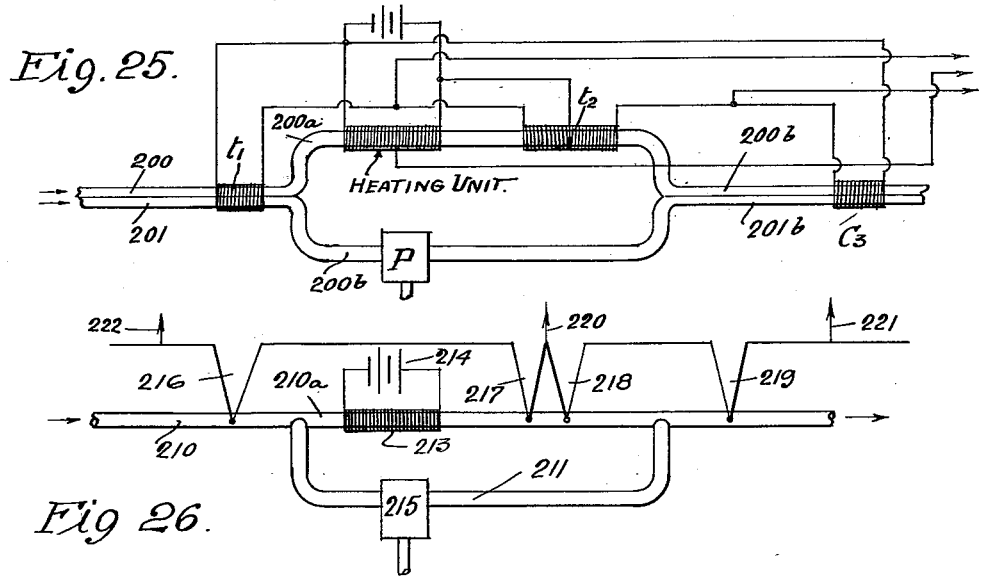
Fig. 25.
Fig 26.
Fig. 27.
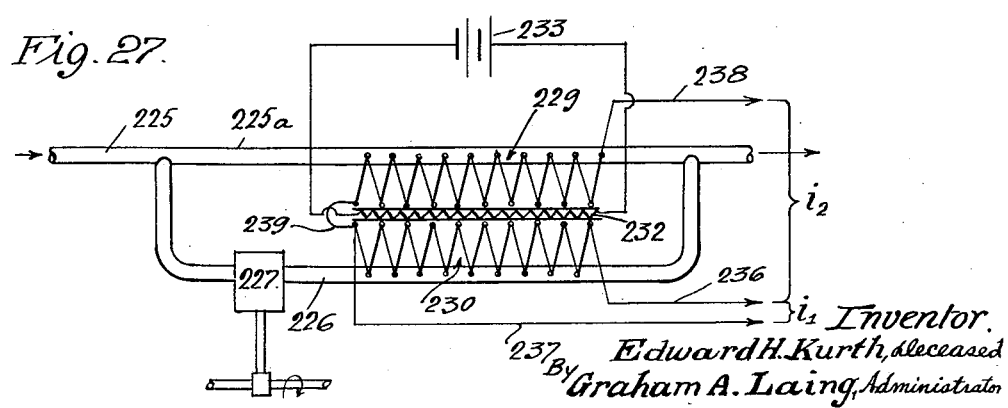
Inventor.
Edward H. Kurth, deceased
By Graham A. Laing, Administrator
Attorney.

Patented Oct. 17, 1939

2,176,502

UNITED STATES PATENT OFFICE 2,176,502

EFFICIENCY METER

Edward H. Kurth, deceased, late of Altadena, Calif., by Graham A. Laing, special administrator, Pasadena, Calif., assignor, by mesne assignments, of one-third to Myrtle Kurth, one-third to Roy J. Kennedy, Pasadena, Calif., and one-third to James T. Barkelew, Pasadena, Calif.

Application February 27, 1934, Serial No. 713,238

3 Claims. (Cl. 235—61)

This invention relates to efficiency or ratio indicating devices, and illustratively and more particularly to devices for giving an efficiency indication which is the quotient of two quantities, one of which for instance is proportional to fluid flow (fuel consumption), and the other of which for instance is proportional to speed of motion. A typical practical application of the invention is as a "miles-per-gallon" indicator for vehicles such as automobiles, airplanes, etc., which derive their power from fuel in liquid or fluid form fed to the motor through a pipe line, and the invention will accordingly be hereinafter particularly described with this application principally in view, but with no implied limitation thereto since the device has numerous other applications in the fields of instantaneous efficiency indication and ratio measurement.

The prior art has provided a number of devices of various types intended for the indication of efficiency of gasoline engine propelled vehicles, in the commonly used units of miles per gallon. Those devices designed to give a direct reading may associate generally three elements, namely, a flow-meter intended to furnish in some manner a quantity which is proportional to fuel flow, a speed unit which gives a quantity related to speed of travel, and a device designed to utilize these two quantities in such a way as to give an indication of their quotient on a scale which may be calibrated in miles-per-gallon units. In what may be called the indirect schemes, the quotient obtaining element may be dispensed with, and a special multiple scale is employed. Each scale is calibrated in the desired units for a definite car speed, and unless the final result is obtained by mental operation after reading both scales, the car must be driven at these designated rates when the efficiency estimation is obtained. The present invention is concerned in its final form specifically with the type of instrument first mentioned, i. e., one in which an instantaneous reading corresponding, for instance, to miles per gallon is immediately obtainable from a simple direct reading scale calibrated in these units; although its principles may be applied to the second type.

In previous efforts to solve the problem outlined above, recourse has been taken to various flow-meter principles. The general difficulties of the application in the instance of an automobile are, however, particularly augmented by the relatively small rate of fuel flow which is available. Because of this condition mechanical flow measuring devices based upon the movement of va..es, etc., are generally subject to a very large error which is due, among other things, to the widely varying viscosity with fuels of different types or at different temperatures. Venturi meters are not, furthermore, in practice very sensitive or accurate at low flow rates, and float or weighing methods have so far proved undesirable and do not appear to be applicable to the problem.

An ingenious scheme originated by Professor Carl Thomas (Journ. Frank. Inst. 1911, 411) has been applied lately with some success to the measurement of gasoline flow. It seems, further, that no obvious difficulty should attend its use with small flows, theory indeed indicating that the sensitivity of this method should increase inversely as to the square of the flow. This method involves essentially supplying a measured amount of heat to the gasoline during its passage through the flow line. Measurements of the fuel temperature before and after supplying the heat energy can then be expressed in terms of the flow of gasoline through the system and of its specific heat. This principle of flow measurement has the great advantage that it is substantially independent of the viscous or turbulent nature of the flow. Unfortunately, however, the measurement does depend upon the specific heat of the fuel, which for substances such as gasoline varies over considerable range with different fuels, and, with any particular fuel, with the temperature ranges commonly met with in daily, locational and seasonal variations of atmospheric temperature. The error so introduced is of such magnitude over the varying conditions of operation encountered in practice as substantially to destroy the usefulness of this method, unless some means can be found for taking these factors into account. The further requirement of this method that the heat input to the fuel must be closely controlled is likewise difficult to meet in practice, particularly if the whole device is to be kept simple and of moderate cost.

Another method of a somewhat similar type based upon a different operating principle was invented later by Professor L. V. King (Journ. Frank. Inst. Jan. 1916). His instrument measures the flow by measuring the cooling of an electrical conductor held at a constant excess temperature above that of the fluid. The same general limitations apply to both methods, which, however, were originally devised for the purpose of measuring the flow of gas in large pipe lines, and did not contemplate the disturbing factors or attempt to meet the particular conditions incident to the present application.

It is apparently due to the fact that the disturbing factors enumerated in the preceding paragraphs have been of such an obscure nature as to escape serious attention, that the problem of providing a practical miles-per-gallon registering instrument that is sensitive to small liquid flows, as well as uniformly accurate in operation under all weather conditions, and with fuels of various physical characteristics, has apparently remained to the present time unsolved.

Various types of speedometer mechanisms to give an indication proportional to speed have been incorporated into combinations with flowmeters; and, although there appears to be no especial difficulty in this element, as such, yet it must be so chosen that its output or indication is suitable for functional combination with the other two elements, the flow measuring and the divisional elements.

The problem of combining the two obtained quantities in such a manner as to obtain a quotient interpretable as miles per gallon likewise has received some attention, but such divisional devices heretofore provided have among other things, usually involved mechanisms which demand forces for their operation larger than are available from the gasoline flow-meter.

It may now be stated as an object of the present invention to provide a preferably direct reading efficiency indicating device of the character mentioned, which is designed with particular view to compensation or entire avoidance of the disturbing factors which commonly render such devices ineffective or subject to serious error; and further with particular view to that delicacy of action necessary to measurement of small flows which vary over comparatively wide ranges.

In accomplishing this and other objects as will appear, the present invention makes use first of two fluid flows which primarily represent the two quantities desired to be compared. These two fluid flows may, in general, either be independent or interrelated, as will be understood later. For instance, in the specific problem of miles-per-gallon the two fluid flows are provided by branching or shunting the fuel line locally, the flow in one of the branches, which is preferably the shunt, being pump controlled to be related to the car speed. With such an arrangement the ratio obtaining between the whole fuel flow and the pump branch flow is the ratio desired.

Then in order to obtain that ratio, the invention next preferably obtains certain temperatures or temperature differences having certain relations to the flows, which are heated for the purpose.

It is in the obtention and final use of these measuring temperatures that the invention is able to eliminate such disturbing factors as varying viscosity, specific heat and heat input, as will hereafter appear. It suffices here to say that these measuring temperatures do not have to bear any direct or even the same proportionalities to the corresponding flows; it is only necessary that, at any instant, they bear what I may call such similar relations to their flows that in their final combination what otherwise would be disturbing factors are cancelled out and a result calibratable as the true flow ratio is thus obtained.

From such measuring temperatures the invention preferably obtains two electrical currents representing the two flows; the currents again bearing such similar relations to the flows that their ratio or comparison is calibratable as the desired flow ratio. In the preferred forms hereinafter set out, the ratio of the measuring temperatures and currents is directly the desired ratio of the two flows; and each temperature and current pair, except for the cancelled out factors, bears a direct or straight line functional relation to the corresponding flow. That, however, is not an essential requisite, as will appear later.

Finally, in this case, we obtain the desired ratio, proportional in this case to miles-per-gallon, the present invention employs a known electrical meter principle which is perhaps best exemplified in a class of instruments generally known as ohmmeters (see Edgcumbe's "Industrial Electrical Measuring Instruments", pages 103–107). These instruments are usually arranged to obtain the value of an unknown resistance directly from a scale reading without reference to the voltage of the battery or source which supplies the current, and while they may not usually be thought of as giving a quotient, they do intrinsically divide the value of one current by that of another. Phase meters and frequency meters which are in very common use likewise make use of this same principle (Theory of phase meters, W. E. Sumpner, Phil. Mag. vol. 11, 1906, p. 81). See in addition Kreuzspulen, Instrumente, Wien; Harms, Handbuch der Experimental Physik, Vol. XI, page 220, and Handbuch der Physik, Geiger und Sheel, Vol. XVI, page 282. In reference to the ohmmeter principle see also Th. Kruger Phip. Zeite. 7, 775, 1906. The instrument provided by the present invention for indication of the quotient of the two electrical currents belongs to the class of meters described in the references mentioned, but is of a special unique design particularly adapted to the practical use to which the present invention is directed.

The invention will now best be understood from the following detailed description, reference for this purpose being had to the accompanying drawings, in which:

Fig. 1 is a diagrammatic view showing a fundamental arrangement of the system;

Fig. 2 is a schematic electrical diagram of the system shown in Fig. 1;

Fig. 3 is a front elevational view of the current quotient meter employed by the present invention;

Fig. 4 is a vertical section taken on line 4—4 of Fig. 3;

Fig. 5 is a section taken on line 5—5 of Fig. 3;

Fig. 6 is a perspective view of the horseshoe magnet and pole pieces employed on the meter shown in Fig. 3;

Fig. 7 is a perspective view of the stationary core of said meter;

Fig. 8 is a perspective view of the double coil system of the meter;

Fig. 9 is a detail view of the pole face of the left pole piece 33 of Fig. 6;

Fig. 10 is a detail view of the pole face of the right hand pole piece 34 of Fig. 6;

Fig. 11 is a detail side elevation of the core of the meter;

Fig. 12 is a view of the core of the meter as viewed from the side in Fig. 11, and with end supporting member removed;

Fig. 13 is a view looking down on the core seen in Fig. 12;

Fig. 14 is a perspective view of the upper end of the core seen in Fig. 12;

Fig. 15 is a detail view of the supporting piece adapted to intersect with the end of the coil which is uppermost in Figs. 12 and 14;

Fig. 16 is an elevation showing a practical arrangement of the mixing system;

Fig. 17 is a section taken on line 17—17 of Fig. 16;

Fig. 18 is a section taken on line 18—18 of Fig. 16;

Fig. 19 is a vertical medial section of a pump suitable for use in the system;

Fig. 20 is a section taken on line 20—20 of Fig. 19;

Fig. 21 is a horizontal section taken on line 21—21 of Fig. 19;

Fig. 22 shows a modified mixing arrangement for the system;

Fig. 23 shows a further modified mixing arrangement for the system;

Fig. 24 shows schematically a variational form of the invention;

Fig. 25 shows schematically another application of the invention; and

Figs. 26 and 27 show schematically two further forms of the invention illustrating the use of thermocouples.

In Fig. 1 is shown schematically one desirable fundamental arrangement of the system. In said figure numeral 10 designates a section of the main fuel or gasoline line, usually of copper tubing, which is understood to be a section taken at some convenient location between the fuel supply tank and the carburetor of a motor vehicle. In a practical installation this section of the gasoline line will be thermally insulated in some suitable manner from the frame parts of the vehicle and from temperature variations of the surrounding air. Numeral 11 designates a branch or by-pass line, of similar tubing, which takes a portion of the gasoline flow from the main line, as from a point 12, and discharges it back into the main line at a point 13 farther down stream, thus by-passing a section 10a of line 10, as in the manner shown.

Pipe section 10a is provided with a means for altering the temperature of the fuel flowing therethrough ($f_1$), and for this I preferably employ a surrounding electrical heater winding 15, although other means for altering (either raising or lowering) the temperature of flow $f_1$ may be employed as will be seen. The temperature of flow $f_1$ beyond the heater winding obviously varies with, among other things, its rate of flow through 10a. The shunt branch or by-pass line 11 is provided with a fuel pump 16, which is arranged to be driven at a rate proportional to the speed of the vehicle. For instance, in Fig. 1 there is indicated for this purpose a pump plunger rod 17 driven by cam 18 on shaft 19, which in turn may be driven by any means that moves proportionately to car speed, as for example by a shaft similar to the usual flexible speedometer drive shaft. The rate of flow through line 11 ($f_2$) is accordingly proportional to car speed.

We may let $f$ be the whole fuel flow,
$f_1$ be the flow through branch 10a,
$f_2$ be the flow through pump branch 11,
$T_1$ be the temperature of the whole flow $f$ of entering fuel,
$T_2$ be the temperature of the fuel flow $f_1$ immediately after passage through the heater, and
$T_3$ be the temperature of the whole flow $f$ leaving the system.

Now $f=$gallons per hour consumed by the engine (at some temperature in general negligibly above the value $T_1$ of the entering fuel).

$f_2=$gallons per hour units at temperature $T_1$, and is made proportional by pump 16 to miles per hour traveled by the vehicle.

Thus, say $f_2 = K_1$ miles per hour, now further, $$f = f_2 + f_1, \text{ or } f_2 = f - f_1$$

Expressing the several flows in terms of the indicated temperatures and heat input Q, we have $$f = \frac{Q}{(T_3-T_1)C} \text{ and } f_1 = \frac{Q}{(T_2-T_1)C}$$

where C, nearly enough in each expression, is the specific heat at the entering temperature, $T_1$, since neither $T_2$ nor $T_3$ in practice will vary greatly from $T_1$; and, therefore $$f_2 = \frac{Q}{(T_3-T_1)C} - \frac{Q}{(T_2-T_1)C}$$

Now $$\text{miles per gallon} = \frac{\text{miles per hour}}{\text{gallons per hour}} = \frac{f_2}{K_1 f}$$

$$= \left[\frac{Q(T_2-T_1) - Q(T_3-T_1)}{(T_3-T_1)(T_2-T_1)C}\right]\left[\frac{(T_3-T_1)C}{Q}\right]\frac{1}{K_1}$$

$$= \frac{T_2-T_3}{(T_2-T_1)K_1}$$

or (1) $$\text{miles per gallon} = K\left[\frac{T_2-T_3}{T_2-T_1}\right]$$

where $$K = \frac{1}{K_1}$$

An examination of this last relation shows that the desired quantity of miles per gallon for this arrangement is uniquely expressed in terms of the three fluid temperatures $T_1$, $T_2$ and $T_3$. It is particularly to be observed that the specific heat of the fuel has been cancelled out and does not enter into the final expression, so that the variations in specific heat of gasoline at various temperatures, and also with different grades of gasoline, have no practical effect whatever in the result. It is further to be noted that the final result is entirely independent of the value of the power input to the heating coil so that it becomes unnecessary to control either accurately or at all the heating current input. In other words the heat input to the fluid, the amount of temperature change in the fluid, is inconsequential; and, furthermore, as consideration of the equations will make clear, it is immaterial whether the temperature change be up or down—whether heat be added or subtracted. The fundamental function of the heater is to change the fluid temperature, not necessarily to raise it. It is in these two most important features that the present invention has perhaps its chief advantage over possible methods depending upon direct use of the older flowmeter principles involving heat measurement, as for instance those of Thomas and King. This comparison is not made in derogation of the Thomas or King flowmeters as such, it being recognized that those flowmeters were originally intended and used for a purpose wherein the disturbing factors incident to applicant's present application are minimized and where the particular conditions of application as well as the fundamental end to be achieved are entirely different. The above comparison is rather made since it appears evident that if either the King or Thomas flowmeter be directly incorporated as flow-meters in a miles-per-gallon device, either device would have the particular disabilities mentioned, whereas the present invention avoids them entirely. The present invention does, however, carry to its particular field of use, in addition to its own special advantages, the chief virtue of the Thomas and King flowmeters in that its operation likewise is free from the large influence of the viscous or turbulent nature of the flow, which enters to give difficulty in mechanical or vane type of flowmeters, depending upon viscosity, impact, or both, particularly with regard to uniformity of operation at different temperatures.

It is particularly to be noted that while the Thomas and King devices are flowmeters, and give a quantitative indication of rate of flow, the present invention does not involve necessarily a flowmeter, since it does not demand actual quantitative flow measurement. On the other hand it does compare or indicate a relationship between two particular quantities for which the proportionality factor relating them to the true fluid flows may vary widely in time but has nevertheless instantly the same value for both flows. In this manner the desirable ratio characteristic of the two flows is accurately obtained without any fundamental necessity of physical flow measurement. It is in this last characteristic, by virtue of which such variable factors as specific heat, heat input, etc., entering into any quantitative consideration of each flow, cancel out in the comparison, that the present invention is to be distinguished from such flowmeter devices.

It will so far be seen that I have provided a system wherein the ratio of two temperature differences is accurately proportional to miles per gallon. I then obtain two electrical currents proportional to these two temperature differences, which currents subsequently are in effect divided one by the other by means of a special electrical meter to give a final reading proportional to miles per gallon. These two electrical currents are obtained by means of the electrical bridge circuit shown in Fig. 1, and in the more conventional diagram in Fig. 2. The electrical heating unit winding 15 is shown connected by leads 20, 21 across a suitable power supply, as a battery 22. This winding is in intimate thermal contact with the tubing section 10a. The tubing should be thin walled and made from good heat conducting material such as copper. Resistance thermometer units or windings $t_1$, $t_2$ and $t_3$ are provided, and are wrapped in intimate thermal contact, respectively, on tubing 10, just ahead of tubing juncture 12, on tubing section 10a between heating winding 15 and tubing juncture 13, and on tubing 10 just beyond tubing juncture 13, as in the arrangement shown in Fig. 1. These thermometer windings will preferably be of some material such as pure nickel, which has a particularly high temperature coefficient of resistance. The thermometer windings $t_1$, $t_2$ and $t_3$ will then take the temperature $T_1$, $T_2$ and $T_3$, respectively, which, as will be remembered, are the temperatures of the whole flow of entering fuel, of the fuel flow $f_1$ directly after passage through the heater winding, and of the whole flow of fuel finally leaving the device in the direction of the carburetor. And since the resistances are linearly proportional to absolute temperatures, the resistances of windings $t_1$, $t_2$ and $t_3$ will be proportional to $T_1$, $T_2$ and $T_3$ on the absolute scale.

Without limiting the invention in any way, I may state that heating coil 15 may have a resistance of, say, three ohms assuming the usual battery current at six volts; $t_1$ and $t_3$ may have resistances of say 60 ohms, and $t_2$, which is of double the length of $t_1$ or $t_3$, and is center tapped, will then have a total resistance of 120 ohms or 60 ohms for each section. One side of $t_1$ is connected by wire 25 to wire 20, and hence to one side of a suitable source of electrical energy 22, which may for instance be the vehicle storage battery, and the other side of $t_1$ is connected by wire 26 to one end connection to $t_2$. The opposite end of $t_2$ is connected by wire 27 to one end of $t_3$, and the opposite end of $t_3$ is connected by wire 28 to wire 20, and thus to the same side of battery 22 to which $t_1$ is connected. Connected to the opposite side of battery 22, via wire 21, is a wire 29 which leads from the center tap of $t_2$. A lead 30 is then connected to wire 26 (between $t_1$ and $t_2$), a lead 31 is connected to a center tap on heating coil 15, and a lead 32 is connected to wire 27 (between $t_2$ and $t_3$).

Reference to Fig. 2, which is a conventional electrical diagram of the connections of Fig. 1, will show that the center-tapped heating unit together with the four equal thermometer units (considering center-tapped coil $t_2$ as divided into two equal and separate units) and battery compose in this scheme of connections essentially a double current bridge network. Since, however, the heating unit branch which is common to both currents is of relatively low total resistance compared with the resistance thermometer pairs, it is sufficient for the instant purpose to consider the center resistance branch (heating unit 15) together with upper units $t_2$ and $t_3$ as one independent simple Wheatstone bridge network, and the center resistance branch combined with lower units $t_2$ and $t_1$, as another.

The analytical expression for the current which would appear as $i_1$ in leads 31 and 32 as a function of the temperature variation of the resistances $t_2$ and $t_3$, considering the upper simple Wheatstone bridge network, and assuming both parts of the center resistance 15 unchanged, is rather long and involved for the present purpose. It may be readily demonstrated, however, that for relatively small changes in $t_2$ and $t_3$, assuming the bridge to have been in initially balanced condition, the current $i_1$ will be linearly proportional to the difference of resistance values of $t_2$ and $t_3$ far more closely than is necessary for the instant purpose. The currents $i_1$ and $i_2$, found in the circuits fed by the pairs of leads 31 and 32, and 30 and 31, respectively, will thus be proportional to the differences of resistances of $t_2$ and $t_3$ and of $t_2$ and $t_1$, respectively. And since the resistances of $t_1$, $t_2$ and $t_3$ are proportional to their temperatures $T_1$, $T_2$ and $T_3$, considered on the absolute scale, currents $i_1$ and $i_2$ are proportional respectively to $T_2-T_3$ and $T_2-T_1$. The quotient of $i_1$ and $i_2$ is therefore equal to the quotient of $T_2-T_3$ and $T_2-T_1$, or $$(2) \qquad \frac{i_1}{i_2} = \frac{T_2-T_3}{T_2-T_1}$$

which is in turn, as has been shown, proportional to miles per gallon. That is:

$$(3) \qquad \frac{i_1}{i_2} = K_1 \text{ miles-per-gallon}$$

The last operation thus becomes, in this particular case, one of simple division. For instance, if current meters should be placed in the circuits of $i_1$ and $i_2$, their indications could be read and their relation mentally calculated; and then, by use of the constant $K_1$, the desired result would be obtained. However, as will be immediately understood, the factor $K_1$ could be included initially by suitably chosen calibrations on the two meters, leaving only the division to be done.

Next, it may be noted that if $i_1$ and $i_2$, instead of bearing linear relations to the corresponding fluid flows, were related to them, say, in the second degree, the desired final result would still be obtainable. Thus, supposing the two currents to be proportional to the squares of the fluid flows, then $\frac{i_1}{i_2}$ would equal $K_1$ (miles-per-gallon)$^2$ and division of $i_1$ by $i_2$ would give an answer involving the square of the desired result, which again could be either reduced by calculation or calibrated out. Like considerations, further, apply obviously to any integral or fractional power relationships.

In general, therefore, since what is ultimately desired is the ratio of two flows, the quantities which combine to give that ratio may bear any continuous and even different functional relationship to the flow magnitudes. It is only necessary that these relationships be of such similarity that, in obtaining the final ratio, all disturbing factors are in effect cancelled out.

It thus now remains in this particular instance to provide an electrical meter designed to give a reading proportional to the quotient of the currents $i_1$ and $i_2$ appearing in the pairs of leads 31 and 32, and 30 and 31, respectively. The electric meter which I employ for this purpose is shown in Figs. 3 to 15, inclusive. This meter embodies a permanent horeshoe magnet M, provided with semi-circular faced pole pieces 33 and 34, a stationary core 35, and a double coil system 36 which moves in the annular space between the pole pieces and core. This coil system, in the present form of the meter, comprises two adjacent rectangular current coils 37 and 38 of the ordinary pattern, fastened together in the same plane as by binding the adjacent coil sides together with suitable tape, as at 39, and is provided with shafts 40 and 41 adapted to be carried in jewel bearings 42 and 43 mounted on the meter. The coil system is shown provided with a suitable indicating hand 45, and the meter is provided with a dial 46, having a miles per gallon scale calibrated as hereinafter to be described. The meter will ordinarily be mounted with its dial on the usual instrument panel of the vehicle.

The pole faces and stationary core are arranged to provide two more or less distinct and separate magnetic fields, one for each of coils 37 and 38. Thus the semi-circular face of pole piece 33 may be divided by a medial groove 50 or by means of a space of similar area into a cylindric face portion 51 and a tapering face portion 52, and the semi-cylindric face of pole piece 34 may be divided by a similar medial groove or space 53 into a cylindric face portion 54 (opposite cylindric face 51 of pole piece 33), and a tapering face portion 55, while the core 35 is made up of a solid cylindrical portion 60 adapted to be positioned within cylindric pole faces 51 and 54, and a portion 61, of special shape to be described, positioned within tapering pole faces 52 and 55, portions 60 and 61 being connected by a pair of pins 62 of non-magnetic material. Core portion 60 may have a non-magnetic bridge portion 63 fast on its outer end, embodying a pair of oppositely extending arms 63a adapted to come against a stationarily mounted ring plate 69 and having lugs 63b adapted to be received in apertures 69a in said ring plate for the purpose of accurately supporting the core in position. It will be evident that the cylindric core portion 60 and cylindric pole faces 51 and 54 provide a uniform radial magnetic field for rearward coil 38. The front coil 37 also moves in a radial field but the shape of the core and pole faces is made such that the magnetic flux varies uniformly with the angle of core swing from a value near or substantially zero for zero scale of the instrument, to a maximum for extreme scale equal to the uniform value provided for rearward coil 38. For this purpose, the opposing pole faces 52 and 55 are made to taper from zero to maximum width, both tapering in the same direction of coil rotation. In the present instrument the stationary core portion 61 within the tapering pole faces is then shaped so as to present tapering faces 61a and 61b opposite the tapering pole faces 52 and 55, respectively, the core faces tapering in the same direction as do the pole faces so as to produce as closely as possible a linearly increasing magnetic field into which the coil 37 may rotate.

Core portion 61 is shaped as well illustrated in Figs. 4, 7 and 11 to 14, inclusive. From these figures it will be seen that the tapering faces 61a and 61b are provided by beveling two halves of core portion 61 in opposite directions. The core end is then notched, as at 64, to take a non-magnetic bridge piece 67 of Fig. 15, which is of proper width and is provided with a notched lower edge 68 so as to interfit with the notched core end. When the core is mounted in position, arms 67a of this bridge piece 67 come against a non-magnetic ring plate 70, and lugs 71 thereon are received in apertures 72 in said plate. This plate 70 is mounted on non-magnetic wedge-shaped blocks 74, which in turn are mounted on the beveled outer surface of pole pieces 33 and 34, in the manner clearly shown in Fig. 6.

Three flexible pig tail connections are made to the moving coil system of the meter, the two coils 37 and 38 being connected to leads 30, 31 and 32 as indicated in Fig. 2. These pig tail connections, which are well known and need not here be illustrated, should be as flexible as possible and may be composed, for example, of annealed silver foil since no restraining spring is used on the moving system. The core portion 61 and 52 and 55 being tapered in the directions here indicated, the coils 37 and 38 are wound in such directions and are so connected that the torque on the rear coil 38 is in a clockwise direction, while the torque on the front coil is in a counterclockwise direction.

The moving system should be carefully balanced, and should be very heavily damped, which may be done magnetically in the usual manner, or achieved in some other suitable way.

The theory of the instrument may be stated as follows:

Let
  $M_1$=torque on rear coil (in uniform magnetic field)
  $M_2$=torque on front coil (in uniformly varying magnetic field)
  $i_1$=current in rear coil
  $i_2$=current in front coil
  $H$=fixed magnetic field in which rear coil turns
  $HK_3\theta$=magnetic field in which front coil turns, where $\theta$ is the angle of swing of the coil and $K_3$ is a constant depending upon the units assumed
  $N_1=N_2$=number of turns on rear and front coils
  $K_4=K_5$=constants depending on coil shape and size.

Torque (clockwise) on rear coil=$M_1=K_4N_1i_1H$.
Torque (counterclockwise) on front coil=$M_2=K_5N_2i_2HK_3\theta$.

Since for equilibrium of the free moving coil system torques $M_1$ and $M_2$ must be equal $$HK_4N_1i_1 = K_5N_2i_2HK_3\theta$$

Therefore $$\frac{i_1}{i_2} = K_3\theta$$

Thus the desired quotient $$\frac{i_1}{i_2}$$

which has been shown to be proportional to miles per gallon, is directly proportional to the angle of swing of the coil system of the meter, and hence may be read directly on a linearly calibrated scale. And this scale may obviously be calibrated directly in miles per gallon units.

The uniform construction of the coil pairs and the suggested field limits are employed because it is believed they are best suited for use in this application. The resulting scale will then be substantially uniform over a wide useful range with one end at zero miles per gallon and the other at the maximum ratio corresponding to the limit of fluid flow ratio obtainable in the by-passing branches. The resistance of the meter coils should of course be properly related to the bridge characteristics for the best sensitivity, and this sensitivity will be a maximum when the resistance of each meter coil is equal to the parallel resistance of the circuit branches which are connected across it. The meter coil resistances may accordingly be made, nearly enough, equal to half the resistance of a single thermometer unit.

The miles per gallon scale on the meter may be determined now by a consideration of the miles per gallon expression, $$K\left[\frac{T_2 - T_3}{T_2 - T_1}\right]$$

Suppose we arbitrarily assume that the usual average efficiency of the automobile for which the system is designed is 18 miles per gallon. This point may then be taken for the center of the scale. The upper limit for a linear variation may then conveniently be taken as double this value, or 36 miles per gallon, the lower limit being zero.

The metering pump 16 may then be designed and arranged to be driven so as to meter one gallon of fuel per hour at a car speed of say 36 miles per hour. Now assuming operation at the maximum efficiency of 36 miles per gallon, the total fuel required by the engine in this instance is passed through the by-pass 11 and pump 16, and the flow through the heating section 10a is zero. Under this condition $T_3$ will obviously be equal to $T_1$, so that $$\frac{T_2 - T_3}{T_2 - T_1} = 1$$

and the quotient meter will read full scale. The system preferably is so designed, however, that a quotient of unity value is never reached, since with such a condition the flow $f_1$ is zero and excessive heating in 10a would develop.

For the case of zero car speed the whole quantity of fuel flowing through the system will necessarily pass through the heating unit. For this condition $T_2$ will be equal to $T_3$, so that $$\frac{T_2 - T_3}{T_2 - T_1} = 0$$

and the meter will read zero scale.

For the mid-scale point, assumed at 18 miles per gallon, $T_3$ will be equal to the average of $T_2$ and $T_1$. That is, for this condition $$T_3 = \frac{T_2 + T_1}{2}$$

so that $$\frac{T_2 - T_3}{T_2 - T_1} = \frac{1}{2}$$

and the meter will designate this ratio at the chosen midpoint on the scale. The scale may then be linearly divided and other suitable points marked. The miles per gallon scale as thus determined is shown calibrated on the dial 46 of the quotient meter at 76 in Fig. 3.

Fig. 1 shows a fundamental arrangement of the fuel flow system, while a more practical and improved arrangement is shown in Fig. 16. The theory of the system requires that $T_1$, which is the temperature of the incoming fuel, be very closely the same as the temperature of the fluid leaving the by-pass pump to mix with the fuel which passes through the parallel line 10a at temperature $T_2$. With the system as shown in Fig. 1, however, this condition might not be perfectly achieved due to a small amount of heat generated in the pump or transferred through it and imparted to the fuel passing therethrough. The arrangement of Fig. 16, while essentially the same as that of Fig. 1, is arranged to obviate any such possible deleterious effects. Thus in Fig. 16 the gasoline line 10' leads through a T fitting 12' to heater line 10a', the pump 16' receiving fuel from the branch of T-fitting 12'. The pipe section 10a' leading toward the heating coil is brought, immediately beyond T-fitting 12', into intimate thermal transfer relation with the by-pass fuel line 11' leading from pump 16', in such a manner and for such a distance as to assure that the fuel flowing through the two branches is very closely at the same temperature. Any well known manner of accomplishing this purpose may be employed; for instance, the two lines may be flattened and brought into contact over a substantial area (see Fig. 17), and may if desired be soldered together. Beyond this heat equalizing section line 10a' is provided first with a resistance thermometer winding $t_1'$, then with a heater winding 15', then with resistance thermometer winding $t_2'$, and finally is joined with the other branch 11', as at 13', and thence the total fluid flows onwardly towards the motor through line 10b. Line 10b has, just beyond the point of mixture of the fuels from lines 10a' and 11', a thermometer winding $t_3'$.

It will be evident that with the piping so arranged, the fuel from pump line 11' which mixes with the heated fuel at 13', and the fuel in line 10a' prior to entering the heater coil, are of very closely the same temperature, which is in reality an essential requirement of the theory as developed earlier in connection with Fig. 1. The temperature of the entering fuel is then not measured until the fuel has passed through the heat equalizing section of pipe 10a', and $t_1'$ is accordingly wrapped on line 11' beyond said equalizing section, and is of course spaced a suitable distance ahead of heater 15'.

The heater shown in Fig. 16 is formed by bending a section of line 10a' double and wrapping with the heating coil, in the manner clearly shown. The dual passage so provided through the heater unit serves both to increase its effective length and to enable the two halves of the center tapped heater winding to be easily balanced against temperature variation relative to each other if wire of appreciable temperature coefficient is used. In any event the two sections of 15 should in practice be wound simultaneously as two parallel wires to render this effect entirely inappreciable.

The balance of the system shown in Fig. 16 is essentially equivalent to that shown in Fig. 1. The resistance thermometer units are separated reasonably from one another and from certain points in the assembly where temperature changes take place, as for instance at the heating winding and at the junction where the two flows meet, so as to prevent substantial heat conduction to the thermometer units along the length of the tubing. If a reciprocating type of pump is used, the flow oscillations in the line in any case obviously necessitate an actual physical separation of the windings by a distance substantially greater than the amplitude of such oscillations. As previously mentioned, the fuel flow system should be thermally insulated against temperature variation from the outside, especially beyond the heat equalizing section of the two parallel branches, so that the measured temperatures will be determined substantially by the flow of fuel.

Suitable heat insulation means is provided for the device of Fig. 16, for instance, by making the pipe couplings and T-fittings of heat insulating material. It will be evident that by such provisions at outgoing line coupling 181, the pipe system of the device is insulated against outside heat reaching winding $t_3'$ by way of the pipe line itself. If support is required for the device between T 12' and coupling 181 such support may be made of heat insulation material. By making the couplings between the several windings similarly of insulation material (it being noted that there are couplings between all windings), heat is substantially prevented from travelling along the pipes from winding to winding. I have further shown in Fig. 16 exterior heat insulation material 183 surrounding the piping system from the pump on and beyond $t_3'$.

These heat insulations may or may not all be necessary to successful operation, depending on conditions. For instance if the piping be of thin copper tubing and the several coils spaced well apart along its length, the heat flow along the tubing may be negligible compared with the heat flow directly through the tubing wall between coil and liquid. I may, however, prefer in all cases to heat insulate as I have outlined.

A pump of a type suitable for the purpose of metering the fuel in the pumping line of the fuel flow system is shown in Figs. 19, 20, and 21. Numeral 100 designates a cylindrical pump body, on the upper end of which is mounted head casting 101. This head casting has a hollow lateral extension 102 which is provided with vertical, and preferably alined, screwthreaded bores 103 and 104, which extend inwardly through its upper and lower walls to communicate with its inner chamber 105. Screwthreaded into lower bore 104 is a tubular valve fitting 106, through which gasoline is introduced to the pump. This fitting is provided with a vertically movable ball valve 107 adapted to seat on a valve seat 108 formed within the bore of the fitting. In order to limit rise of ball 107, I prefer to employ a narrow bridge piece 109 which is engaged by the ball as it rises, said bridge piece being formed on the lower end of a bushing 110 screwthreaded within the bore of fitting 106. It is highly desirable for reasons that will appear hereinafter that this intake valve be freely operating, and for this reason ball 107 is used without a spring and is made comparatively light.

An outlet valve fitting 114 is screwthreaded within upper bore 103, and is furnished with a spring pressed ball valve 115 seating on a valve seat 116 formed within the bore of the fitting.

The chamber 105 of head casting 101 communicates with a downwardly extending bore 120, the lower end of which is defined by a flange portion 121 which is annularly spaced within the cylindrical wall of pump body 100. A flexible, corrugated tubular diaphragm or Sylphon 124 is arranged in the pump housing immediately below head 101, and its upper end is crimped over and soldered to head flange 121 as clearly shown in the drawings. The lower end of Sylphon 124 is crimped over and soldered to a similar flange 125 formed on the upper head of a piston 126 which is vertically reciprocable in the cylindric bore of pump housing 100. This piston member 126 comprises a substantially flat circular head, and a pair of integral depending legs or posts 127, on the lower ends of which is mounted a bottom head 128. Between the two heads of the piston, and bearing on both of them, is a driving eccentric 130, which is mounted on a shaft 131 journalled in bearings 132 and 133 mounted in the side walls of the pump body, as shown. Where the pump is to be driven by a shaft turning over at a rate higher than that desired for the pump shaft, a reduction gear set is employed which is conveniently mounted on the pump body. For instance, there is here shown rigidly mounted on shaft 131 just outside the pump housing a large gear 135, which meshes with a smaller gear 136 on a stub shaft 137 mounted in a bearing formed in the pump housing wall above shaft 131, and on the outer end of shaft 137 is a large gear 138 which meshes with a smaller gear 139 on a hollow drive shaft 140 which surrounds and turns on shaft 131. The hollow shaft 140, or its end portion that contacts with shaft 131, may be of insulating material to complete the heat insulation of the pump. Assuming the hollow shaft 140 driven at the speed of the standard speedometer cable, which is 1000 revolutions per mile of car travel, the reduction gear set described may have a ratio of 9.75–1, giving a pumping speed of one stroke per second for a car speed of 35 miles per hour, which is an appropriate speed for this type of pump and for its function in the system.

The operation of the pump will be obvious, the eccentric 130 reciprocating piston 126 to extend and contact Sylphon 124, whereby liquid fuel is alternately drawn in and expelled through inlet and outlet valve fittings 106 and 114, respectively. The throw of eccentric 130 is of course made such as to give very accurately the flow desired from the pump for a given speed of the pump drive.

It is highly desirable to avoid substantial subatmospheric pressures in the pump, since the gasoline fuel contains volatile fractions which will vaporize under reduction in pressure. Accurate operation of the system requires that the pump take a uniform charge on each stroke, at varying speeds and at varying gasoline temperatures. In order to prevent fuel vaporization on the suction stroke it may therefore be desirable to maintain a slight pressure at the intake valve. The intake ball valve 107 is also made light in weight and is arranged to lift easily, so that substantial pressure reduction will not occur on the suction stroke before the valve opens.

I have now described one type of pump which appears to be especially suitable to the instant use, in that it will give dependable service indefinitely, as well as assure great accuracy in the amount of fluid pumped per pump stroke. It will be understood, however, that any other type of pump that will accurately meter the gasoline in the pumping branch of the system may be substituted if desired.

Figs. 1 and 16 show one arrangement of the elements of the flow system in accordance with the present invention. This arrangement has the one disadvantage that with very high efficiency, that is, in case less fuel is being consumed by the motor than is being pumped by the metering pump 16, a negative flow $f_2$ will result through the heating line 10a. This would not occur over the important working range of the system, but only for such conditions as possibly where the car is moving without drawing upon the engine for full power, as in coasting with idling engine. Such a condition, however, is positively prevented by the modification shown in Fig. 22. In that figure the incoming line 150 branches at 151 into a heater and pump line 152, and a by-pass line 153, lines 152 and 153 again joining at 154 and discharging into outgoing line 155. The pump 156 and heater 157 are in this case both in the same branch line, rather than being one in one line and one in the other, as in the previous form. Windings $t_1''$ and $t_3''$ are wrapped on the incoming line 150, winding $t_4''$ is wrapped on pump branch line 152, between the heater and juncture 154, and winding $t_2''$ is wound on outgoing line 155. The theory of this system is developed as follows:

$$Q = C(T_2 - T_1)f$$

and $$Q = C(T_4 - T_3)f_2$$

Where Q is heat quantity put into flow through the main line, $f$ is the total flow through the system, $f_1$ the flow through 153, $f_2$ the flow through 156 and 157, and $T_1$, $T_2$, $T_3$ and $T_4$ are the temperatures of the liquid at $t_1''$, $t_2''$, $t_3''$ and $t_4''$, respectively.

Now, miles per gallon =

$$\frac{f_2 K}{f} = \frac{C(T_2 - T_1)QK}{C(T_4 - T_3)Q} = K\left[\frac{T_2 - T_1}{T_4 - T_3}\right]$$

The desired quantity of miles per gallon is thus again a simple ratio of temperature differences, which can again be measured by a bridge network and quotient meter such as described above. For instance, employing such a network as that shown in Fig. 2, $t_2''$ and $t_1''$ may be connected in that order in the two upper arms of the bridge, and $t_4''$ and $t_3''$ in that order in the two lower arms of the bridge. In the particular arrangement of Fig. 22 the temperatures $T_1$ and $T_3$ may be considered as equal, with such intimate spacing of $t_1''$ and $t_3''$ as shown in Fig. 22.

Fig. 23 shows another form, differing from that of Fig. 22 only in that the line 160 having the pump 161 and heating unit 162 discharges back into the main flow line 163 at the same point 164 at which it takes fuel from the main line, and in that $t_3''$ is wrapped on the pump and heating line between 164 and the pump, instead of on the incoming line with $t_1''$. $t_1''$, $t_2''$ and $t_4''$ are in the same relative positions as in the form of Fig. 22. This system is essentially the same as that of Fig. 22, and the same relations hold, namely, $$\text{miles per gallon} = K\left[\frac{T_2 - T_1}{T_4 - T_3}\right]$$

The system of Figs. 22 and 23 have an important practical advantage over the form of Figs. 1 and 16 in that there is no need of bringing the temperature of the fuel flowing from the pump into equilibrium with that flowing into the heating section, as was done in the device shown in Fig. 16. The systems of Figs. 22 and 23 are also of advantage in that there can be no negative flow through the heater, since the pump keeps the fuel always in motion therethrough so long as the vehicle is in motion. When the vehicle stops, however, the fuel in the pump circuit ceases to flow, and excessive heating may then develop. This may also occur under other conditions in the heating line 10a of the form of Fig. 1. To obviate this undesired condition, I may make some such provision as the inclusion of a thermostatic circuit breaker in the circuit of the battery supplying the heater winding, for instance as indicated at 170 in Fig. 1, which will be adjusted to open the circuit to the heater upon increase of temperature by some predetermined amount above normal.

It has been shown that the desired quantity of miles per gallon is uniquely proportional to a ratio of temperature differences, and is not functionally related to the heat input, which therefore need not necessarily be controlled. The sensitivity of the whole device does depend, however, upon the temperature differences developed, and these in turn are directly proportional to the heat input as well as inversely related to the flow. The heat input must not be so great as to cause fuel volatilization, but may be adjusted and controlled to increase with flow, remaining always under the point of fuel vaporization. This may be accomplished by utilizing for the source of electrical energy a generator which is driven proportionately to the speed of the vehicle. In Fig. 1 there is diagrammatically shown a generator 22' driven by the pump drive shaft 19, this generator being connected by leads 22a and 22b controlled by switch 22aa across heater winding 15. It will be understood that if such a generator is used, the battery at 22 may be omitted. The power supplied by this generator will ordinarily vary with the square of its speed of rotation, and the heat input to the system accordingly will increase proportionately to the square of the speed of vehicle travel, thus tending to build up the sensitivity of the device with increased vehicle speed. Further the difficulty of excessive fuel temperatures at low or zero car speeds for the devices of Figs. 22 and 23 previously referred to does not arise.

It has been fully pointed out hereinbefore how the present invention is to be distinguished from either the Thomas or the King flowmeters. It will be recognized, however, that the now described forms of the invention (Figs. 1, 2, 16, 22 and 23) do in one respect resemble the Thomas method of flow measurement, in that they involve supplying heat to the liquid, and measuring or comparing the temperatures of the liquid both before and after supplying the heat energy.

Another form of the invention, now to be described, (see Fig. 24) perhaps more nearly resembles the King method of flow measurement, in that it depends upon the cooling of a conductor held at an excess temperature, above that of the liquid. Referring to Fig. 24, it will be seen that the total flow $f$ in gallons per hour has been divided into two branches $f_1$ and $f_2$, with branch $f_2$ provided with a controlling pump P designed as before to meter the flow $f_2$ in this passage at a rate proportional to miles per hour. Two equal low resistance coils $R_1$ and $R_2$ composed of some material having a high temperature coefficient of resistance, for example, nickel, are wound in the positions shown on the total flow line 10 and the pump branch 11, and are connected in series with similar external resistances $C_1$ and $C_2$ of negligible temperature coefficient. Each series pair is connected across a power source B. Two Wheatstone bridge circuits are then completed by equal but relatively high resistances $rt_1$, $rt_2$, $c_1$, and $c_2$, as shown. $rt_1$ and $rt_2$ are of the same material as $R_1$ and $R_2$ and are likewise wound in intimate relation with the flow or flow tubes 10 and 10a, as schematically shown, while $c_1$ and $c_2$, like $C_1$ and $C_2$, are external and of negligible temperature coefficient material.

The resistance characteristics of the two Wheatstone bridge circuits are chosen such that practically all of the power from the source is dissipated in the resistance branches containing $R_1$ and $R_2$, while only a negligible amount is left available to develop heating in $rt_1$ and $rt_2$. Because of this condition the temperatures of $rt_1$ and $rt_2$, and consequently their resistances, will be substantially determined only by the temperature of the liquid flowing through or in contact with them, and they may consequently serve as a measure of this temperature. The temperatures of windings $R_1$ and $R_2$, on the other hand, will, because of their considerably greater power dissipation, be elevated appreciably above those of the enclosed liquid streams so that the exact values of these coil temperatures in relation to the liquid temperatures as measured by $rt_1$ and $rt_2$ will be some function of the stream velocity in each instance. In this manner, two currents related to the significant temperature differences are obtained as before and these may again be compared in a division meter calibrated in miles-per-gallon units. In this arrangement, the value of current $i_1$ is a function of the resistance difference between $R_1$ and $rt_1$. Since the temperature of $rt_1$ is substantially that of the incoming liquid flow, and the temperature, and resistance, of $R_1$ decreases as flow increases, the value of current $i_1$ is thus a function of the total flow in 10—a function of gallons per hour.

The temperature of $rt_2$ is that of the flow leaving coil $R_1$, and therefore that of the pump branch flow entering coil $R_2$. For reasons the same as above expressed, current $i_2$ is thus a similar function of the flow through pump branch 11—a function of miles per hour. The quotient $$\frac{i_2}{i_1}$$

is consequently proportional to miles per gallon.

It may here be noted that analysis shows the Thomas method of flow measurement to be twice as sensitive as the King method as applied here. The forms of the present invention that correspond to the Thomas method, namely, that of Figs. 1, 2, 16, 22 and 23, have likewise a corresponding advantage over the form (Fig. 24) that corresponds to the King method, and from this standpoint are therefore preferred.

It may also here be noted that, although the resistance thermometer units of the systems of Fig. 1, etc., must of course carry some current and therefore be at a temperature somewhat higher than the liquid, thereby introducing some error, I find that such effect as it finally influences the operation of my system vitiates its accuracy only negligibly.

Fig. 25 shows one further typical application of the invention. In this instance there are two separate flow lines, 200 and 201, which are first in intimate contact so as to temperature equilibrate the fluids flowing therein, then are separated, as at 200a and 201a, and are finally brought back into intimate contact, as at 200b and 201b, to again temperature-equilibrate the fluids passing therethrough. The system is here shown equipped with identically the same electrical heater, resistance thermometer windings and pump as provided for the elemental system of Fig. 1, the only difference being that the two lines having the heat winding and pump units do not necessarily originate from a common source and do not join beyond said units, while the resistance thermometer windings $t_1$ and $t_3$ are shown wound around both lines together. It will be evident that the system in this form is fundamentally the same as that of Fig. 1, since it is not fundamentally essential that the fluids originate as a single stream, and then finally mix together, but only that they be temperature equilibrated at corresponding points.

In such a system the final ratio measurement will be that which obtains between two flows— the flow through branch 200b and the total flow through both branches, providing of course that the specific heats of the fluids in both branches have a constant ratio.

Thermocouples or other means instead of resistance thermometer units may, of course, be used to measure the temperature differences involved in the analytical expressions, and these may sometime be desirable.

In Fig. 26 is shown one form of the invention employing thermocouples, the main flow line being indicated at 210 and the by-pass line at 211. The by-passed section 210a of line 210 is shown provided with a heating coil 213, fed with electric current supplied by a battery 214, while by-pass line 211 is provided with a pump 215 adapted, as before, to be driven for instance in accordance with velocity of motion. Four single thermocouple units 216, 217, 218 and 219 as illustrated or, if desired, four multiple units are now arranged with their junctions in suitable association with the flow line, thermocouples 216 being arranged to be influenced by the temperature of fluids entering heating section 210a and by-pass 211, thermocouples 217 and 218 being arranged to be influenced by the temperature of the fluid in heating section 210a after being heated, and thermocouple 219 being arranged to be influenced by the final temperature of the fluid beyond the point where the by-passed fluid rejoins the main fluid stream. According to the convention here employed, the two different metals of each thermocouple are indicated by heavy and light lines. Analysis not necessary here to give shows that leads 220 and 221 connected across thermocouples 218 and 219 will now carry an electric current $i_1$ which is proportional to $T_2-T_3$ ($T_2$ and $T_3$ being the respective temperatures influencing thermocouples 218 and 219); while leads 222 and 220 connected across thermocouples 216 and 217 will carry an electric current $i_2$ which is proportional to $T_2-T_1$ ($T_2$ and $T_1$ being the respective temperatures influencing thermocouples 217 and 216). It will now be seen that the desired currents are obtained directly from the thermocouples, and the quotient of these currents may be obtained immediately by connecting leads 220, 221 and 222 directly to the quotient meter. It will be evident that this form of the invention follows the general arrangement of the system shown in Fig. 1, although it will be obvious that corresponding changes may likewise be made in the systems of Figs. 22 and 23 to adapt them to employment of thermocouples in place of resistance thermometer elements.

In Fig. 27 is shown another form of the invention employing thermocouples. There is again provided a main flow line, here designated at 225, a by-pass line 226 paralleling a section 225a of the line 225, and a driven fluid pump 227 in line 226. Multiple thermocouple elements 229 and 230 are arranged with their cold junctions in thermal association with flow line section 225a and by-pass line 226, respectively, and with their hot junctions in position to be heated by a common heater winding 232. Heat supplied by the common heater 232 to the hot junctions flows through each thermocouple to the fluid in association with the cold junctions; and the temperature difference in each thermocouple will be related to the fluid flow associated with it. In such an arrangement of thermocouples 229 and 230, the current supplied by each will be related to the fluid flow through the flow line with which its cold junctions are in thermal association. Accordingly, thermocouple 230 has connected to one of its ends a lead 236 and to its other end a lead 237, so that a current $i_1$ will appear in said leads which is related to the flow in line 226, or in other words to the performance of pump 227. A lead 238 is then connected to one end of thermocouple 229, and a connection 239 made between the other end of thermocouple 229 and the corresponding end of thermocouple 230. Leads 238, 239 and 236 thus form a circuit in which the two thermocouple banks are connected in series, and a current $i_2$ will appear in that circuit related to the flow through both lines 225a and 226, or in other words to the total flow through the system. Leads 236, 237 and 238 may then obviously be connected directly to the quotient meter to obtain the quotient of $i_1$ and $i_2$, which is the ratio finally desired.

It will be seen that both the systems of Figs. 26 and 27 embody the characteristic features of the forms of the invention previously described which bring about cancellation of errors due to variable specific heats, and permit the obtainment of two electrical currents which are related to the two fluid flow quantities desired to be compared.

A general summary of the systems described may now be helpful in understanding their broader features. As I have said, the final purpose of the system is to determine a ratio which has in this description been treated as an efficiency ratio and more particularly as an efficiency ratio between a velocity (miles per hour) and a fuel consumption rate (gallons per hour), to obtain an answer (of miles per gallon). More broadly speaking, the entity here represented by velocity can be any performance, that is, the fluid flow through the by-pass pump line can be made proportional to any performance; e. g., work done, horse-power delivered, quantity of motion, etc. Likewise entity here specifically represented by fuel consumption may be any entity; the corresponding fluid flow may be related or proportional to any entity desired to be compared with the other entity represented by the other fluid flow.

Broadly speaking, there is no relationship or operative interconnection necessary between the fluid flow in the main line and the performance measured by flow in the other line—a fundamental final function of the system is the ratio comparison of two fluid flows, and in that view it is immaterial what the fluids are or where the flows originate, or what either represents.

Generally, the two flows may originate in different sources; and it is not necessary to the operation of the system that the two flows be mixed when the final temperature is measured. Broadly speaking, then, the system in some of its aspects contemplates the ratio comparison of two fluid flow quantities. And in this broad aspect those two flow quantities may represent any proportionate entities desired to be compared. The two fluid flow quantities here spoken of are illustrated in the foregoing descriptions as the by-pass or pump line flow, and the total flow.

More specifically, and for wide application to practical uses, as well as for the specific use given, the invention contemplates the common origination of the two fluid flows, for by that feature it is insured that the two flows will be of the same fluids and at equal temperatures—although two entirely separate flows can be temperature equilibrated by such an arrangement as shown in Fig. 25. Particularly, though, where the fluids are of varying specific heats with temperature, or with different compositions, it is desirable to take both flows from a common source and to see further that they are closely temperature equilibrated. And finally, it is practically desirable to mix the two flows for most effective heat transfer. Consequently, in its most preferred form, the invention takes the physical forms before described; with the two flows originating commonly, and finally joining.

There are, however, some marked preferences between the several systems that have been described. Those arrangements (Figs. 24 and 27) which employ the operating principle (King) of variations in temperature of the heater, are affected at least to some extent or under some conditions, by variations in fluid viscosity, and turbulence of flow. On the other hand, those systems (Figs. 1, 16, 22, 23, 25, 26) which employ the operating principle (Thomas) of measuring temperatures before and after heating, are not subject to difficulties connected with viscous flow; because in these latter cases the temperatures measured by the temperature units are not affected by viscous and turbulent types of flow (the thermometer units being in close temperature equilibrium with the fluids) and because the final temperature ratios are functionally independent of the exact quantity of heat taken up from the heater by the fluid, which quantity is affected by variations in the types of flow referred to.

Thus, in the latter systems, the only remaining variable having to do with the fluid is the variable specific heat under different conditions and at different times. Dealing specifically with motor fuels of variable specific heats, it is seen that a precisely accurate and therefore useful ratio is obtained in spite of the fact that the respective finally compared quantities appearing as electric currents are only instantly proportional to their corresponding mutual flow quantities; and it is thus one of the final attainments of my system that when operating on such variable fluids it automatically cancels out their variabilities.

What is claimed is:

1. In apparatus for obtaining the fuel consumption efficiency of an automobile having an engine and a main fuel supply conduit conducting fluid fuel thereto, a second conduit joined at both its ends to said main conduit and thereby forming two local branch conduits, a pump in one of said branch conduits, means for driving said pump at speeds proportionate to automobile velocity, means for applying heat to the fuel in one of said branch conduits, and an electric circuit including means for producing two electric currents, and including means controlled by the fluid temperatures at points in the heated branch conduit and in the main fuel supply conduit ahead of and beyond the points of juncture of said second conduit with said fuel supply conduit for regulating one of said currents in accordance with the total fluid flow in said main conduit and the other of said currents in accordance with the fuel flow in one of the branch conduits.

2. In apparatus for obtaining the fuel consumption efficiency of an automobile having an engine and a main fuel supply conduit conducting fluid fuel thereto, a branch conduit joined at both its ends to said main conduit, a pump in said branch conduit, means for driving said pump at a speed proportionate to automobile velocity, means for applying heat to the fuel in said branch conduit, and an electric circuit including means for producing two electric currents, and including means controlled by the fluid temperatures at points in the heated branch conduit and in the main fuel supply conduit ahead of and beyond the points of juncture of said branch conduit with said fuel supply conduit for regulating one of said currents in accordance with the total fluid flow in said main conduit and the other of said currents in accordance with the fuel flow in said branch conduit.

3. In apparatus for obtaining the fuel consumption efficiency of an automobile having an engine and a main fuel supply conduit conducting fluid fuel thereto, comprising a second conduit joined at both its ends to said first main conduit and thereby forming two local branch conduits, a pump in one of said branch conduits, means for driving said pump at a speed proportionate to automobile velocity, means for applying heat to the fuel in one of said branch conduits, and an electric circuit including means for producing two electric currents, and including means controlled by the fluid temperatures at points in the heated branch conduit and in the fuel supply conduit ahead of and beyond the points of juncture of said second conduit with said fuel supply conduit for regulating one of said currents in accordance with the total fluid flow in said main conduit and the other of said currents in accordance with the fuel flow in the heated branch conduit.

GRAHAM A. LAING,
*Special Administrator of the Estate of Edward H. Kurth, Deceased.*